United States Patent [19]
Welham

[11] 3,778,134
[45] Dec. 11, 1973

[54] REFLECTIVE HALF-LENS RECTIFIER
[75] Inventor: Brian H. Welham, Fairport, N.Y.
[73] Assignee: Bausch & Lomb Incorporated, Rochester, N.Y.
[22] Filed: Jan. 15, 1971
[21] Appl. No.: 106,729

[52] U.S. Cl.................. 353/5, 350/202, 350/252, 353/70, 355/52
[51] Int. Cl................. G03b 21/00, G03b 21/14
[58] Field of Search .................. 353/5, 6, 69, 70; 350/202, 252; 355/52

[56] References Cited
UNITED STATES PATENTS
3,044,357 7/1962 Linke.................. 350/202
3,051,049 8/1962 Linke.................. 350/202
FOREIGN PATENTS OR APPLICATIONS
983,342 0/1965 Great Britain.................. 350/202

Primary Examiner—Louis R. Prince
Assistant Examiner—Steven L. Stephan
Attorney—Frank C. Parker and John E. Leonarz

[57] ABSTRACT

A photograph or other graphical display having a tilted image is illuminated on an input stage which is coplanar with an output stage. Apparatus for the removal or inducement of distortions in various kinds of terrestrial photographs and other graphics. In such apparatus reflective half-lens is arranged for arcuate motion about a pivot point located coplanar with the input and output stages. Rays emanating from the input photograph are passed through the lens to a mirror, reflect from the mirror and are passed through the lens again to form an image on the output stage, which image may be a unit-magnification, rectified image of the input photograph if the lens has first been suitably adjusted along its arcuate path. Alternately, the lens may be fixed in position and the input-output stages let to pivot about the pivot point.

5 Claims, 3 Drawing Figures

BRIAN H. WELHAM
INVENTOR.

BY

JOHN LEONARZ

ATTORNEY

BRIAN H. WELHAM
*INVENTOR.*

BY JOHN LEONARZ
ATTORNEY

REFLECTIVE HALF-LENS RECTIFIER

BACKGROUND OF THE INVENTION

1. Field of the Invention

This invention pertains to the field of inducing image distortions, or image rectification and may find its most immediate applications in connection with the rectification of aerial photographs or the removal or inducement of distortions in various kinds of common terrestrial photographs and other graphics.

2. Description of the Prior Art

Rectifiers suitable for use with large format aerial photographs traditionally are large, complex, and expensive machines, being required to satisfy what has come to be known as the Scheimpflug condition, that the input, output and lens planes should all meet, if extended, along a common line in order that sharp definition and geometric integrity should be maintained in the output image. Of course, the image conjugates must be held in the correct ratio, dependent upon the lens used, for the image to be in focus. Both the complexity and size of a rectifier could be greatly reduced if it were feasible to eliminate one of the three planes, since if there were only two planes they would meet automatically along their common edge. No previous rectifiers are known to have this feature.

Reflective half-lenses are known, as are for instance disclosed in U.K. Pats. Nos. 983,342 and 1,008,952, wherein no statement appears as to the contemplated use of the lenses.

SUMMARY OF THE INVENTION

Mapping of the earth by means of aerial photographs would be greatly eased of complications if stable camera platforms could be devised which would point a camera axis precisely perpendicular to the earth's surface, for then if the terrain were flat enough, the camera lens were free of distortion and the earth curvature were insignificant, the resulting photograph would be an equal-area perspective of its subject. Since the available camera platforms do not fulfill these conditions equal-area perspectives, such as maps or photomaps, still depend upon mechanical means (e.g. stereoplotters) and optomechanical means (e.g. rectifiers, orthophoto printers) for the correction of tilts which are inherent in aerial photographs. Rectifiers typically have been more or less conventional image projectors comprising in linear succession a light source, optical condensing means, a film gate, a mounted lens, and an easel for a screen, and having means for moving the film gate, lens, and easel relative to one another to fulfill the Scheimpflug condition.

In my invention, I have conceptually folded a standard rectifier along a line perpendicular to the optical axis of the lens and through the center of the lens, thereby bringing the film gate, or input platen, into the same plane as the easel, or output platen. Thus, the plane of the input and the plane of the output are made to coincide and become one. The plane through the center of the lens and transverse to its optical axis therefore will be either parallel with the input-output plane or will intersect it, and, as noted below, the image conjugates must be in proper ratio; therefore in either case the Scheimpflug condition is satisfied. The output imagery will therefore always be in sharp focus.

A reflective half lens is used. Such a lens or lens system comprises at least one lens element serving as half the lens and a mirror placed at the center of the lens or lens system. After rays from an object pass through the lens element they are reflected from the mirror back through the lens element, the net effect being that of a perfectly symmetrical lens. Such a lens system inherently provides the correct image conjugates when adjusted to twice its focal length from the isocenter, and it thereby produces a one-to-one magnification in a non-rectifying image projector.

It must be realized, however, that a tilted photograph does not have a uniform scale, the areas nearer the camera being imaged at a larger scale than those further away. If the terrain is flat, the nadir point in a photograph will have the largest scale and successive lines concentric about the nadir point might be drawn to mark areas of equal scale, each concentric area being of progressively smaller scale departing from the nadir. If the plane of the tilted photograph can be imagined to be superimposed upon the plane of a vertical photograph taken from the same exposure station, the two will intersect along what is called the isoline. The photographic scales will be the same in both photographs along the isoline and my rectifier may in that sense be said to produce one-to-one magnification of the rectified photograph with respect to the isoline of the original tilted one. Analyses of the geometrical and optical requirements for rectifiers are developed in several sources. See Manual of Photogrammetry, 3rd Ed., Vol. II, pp. 803–850, 1966; and *Notes on the Rectification of Tilted Aerial Photographs*, E. Church and A. Faulds, 1955. These sources show that the problem of rectifying frame photography can be solved, in principle, by two basic concepts. These are the Scheimpflug condition which establishes the requirement for focusing of tilted input and output platens, and the Parallelogram Principle which establishes the geometrical requirements for utilizing a single rectifier lens at various tilt angles and magnifications. These principles result in equations for the five settings of the fixed lens rectifying camera. Two of these settings are the angles between the input and output platens and the plane perpendicular to the rectifier lens. Two other settings are the distances between the lens and the input platen and between the lens and output platen. The fifth quantity is the required decentering on the principal point of the input photograph to obtain geometrically correct rectification.

In the case of a one-to-one rectifier (in which the isoline magnification factor is one), the formulas for these quantities reduce to a very simple form as shown below:

$$\sin \alpha = F \sin t / C \qquad (1)$$

$$d = C \tan t/2 \qquad (2)$$

where
 $\alpha$ = tilt of the input and output platens
 $F$ = rectifier focal length
 $t$ = tilt to be rectified
 $C$ = focal length of input photograph
 $d$ = decentration of principal point The lens to platen distances of a one-to-one rectifier are a constant which is twice the focal length of the rectifier lens. Furthermore, the intersection of the lens axis and the input-output platen is always the required position of the photographic isocenter.

FIG. 1 illustrates the settings of a conventional one-to-one rectifier. If a retro lens is placed at the perspective center 12, the figure may be folded about the line A—A as shown by FIG. 2. Note that the ray from the principal point (p) in FIG. 2 is reflected from the reflective half-lens at the perspective center toward its correct position on the ouput platen (P). This also applies to the general point whose chief ray is indicated by the dashed line in both figures.

The input and output platens now occupy the same plane and do not need to be tipped relative to each other, thus obtaining the simplicity and size reduction goals.

A rectifier based upon these principles would in its simplest form, require an offset d of the input principal point and a rotation of the lens axis relative to the platen about an axis perpendicular to the plane of FIG. 2 through the isocenter I, i.e. the lens would be mounted on an arm hinged to the platen at I, the isocenter.

When using conventional photography where the offset distance is small, there is a potential problem resulting from the almost complete overlap of the input and output formats on the printing platen. This is overcome by printing the photograph in two halves about the isoline.

DESCRIPTION OF THE PREFERRED EMBODIMENT

Figure 3:
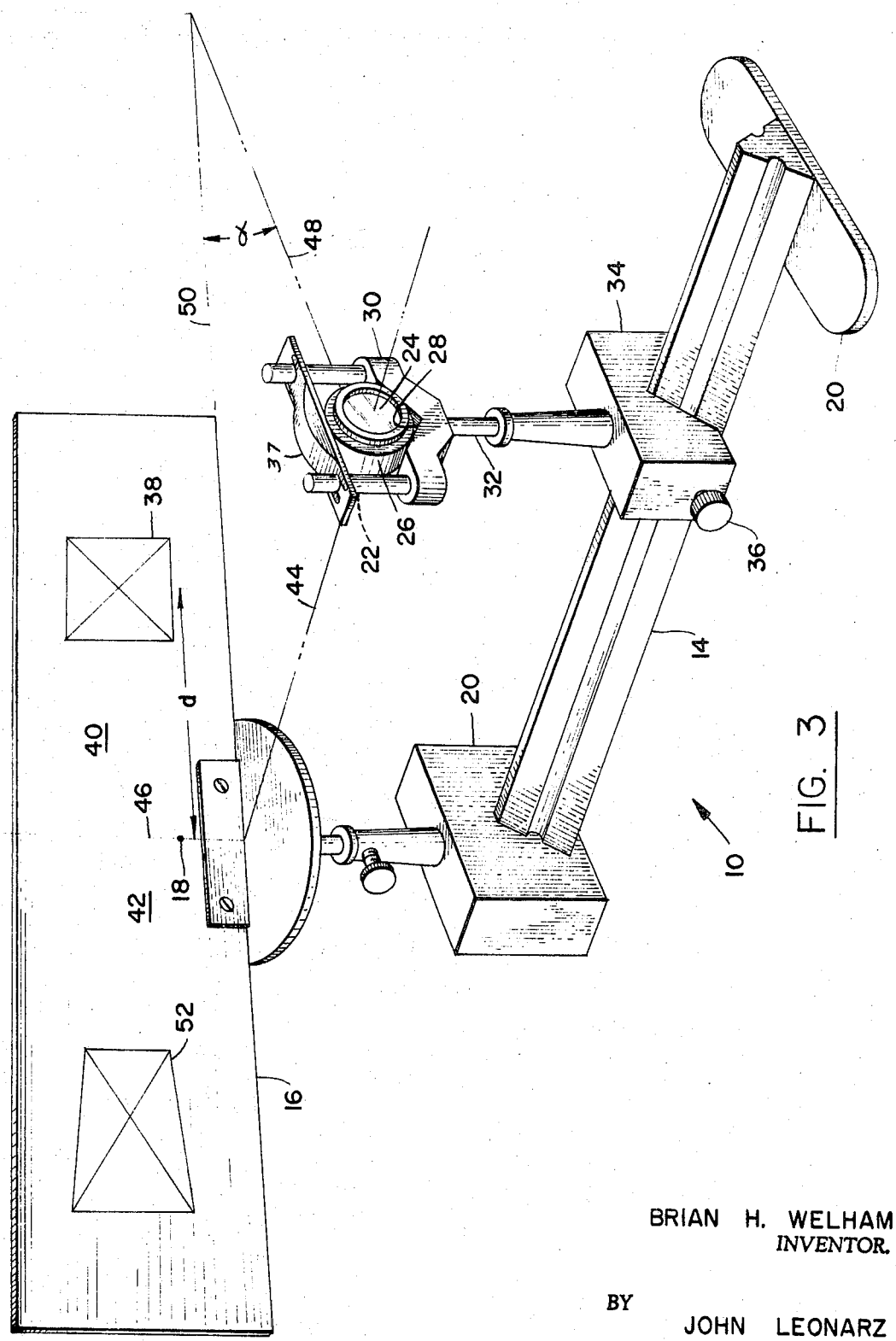
FIG. 3 is a perspective view of an embodiment of the rectifier of my invention.

A rectifier 10 built according to the above principles may take one of two forms. Either the lens mounting arm 14 would be fixed with the platens and the stage 16 free to rotate about the isocenter 18, or the stage 16 would be fixed and the lens would be rotatable about isocenter 18. In the device shown in FIG. 3 stage 16 was left rotatable. The arm 14 is mounted on suitable feet 20. The reflective half-lens 22 includes at least one lens element (not shown) having a mirror element 24, to the carefully aligned with the lens element in lens mount 26. The mount 26 rests of V-notch 28 in the mount holder 30, which is adjustable in height by means of the adjustable telescoping shaft 32. The shaft 32 rides on the block 34 whose position is adjustable along the arm 14, subject to being locked in position by thumbscrew 36. The reflective half-lens 22 is held in position by a releasable clamp assembly 37 which permits changing reflective half-lens unit. Such interchangability permits the use of various reflective half-lens units depending upon the geometry of the particular rectification problem.

A tilted input photograph 38 is mounted by suitable means on the input side 40 of the stage 16, for projection upon the output side 42. Where the physical size of the photograph is such as to overlap the isocenter 18, it must be appreciated that the input side 40 and output side 42 will be interchanged after the first side of the photograph has been projected to the output platen.

Figure 1:
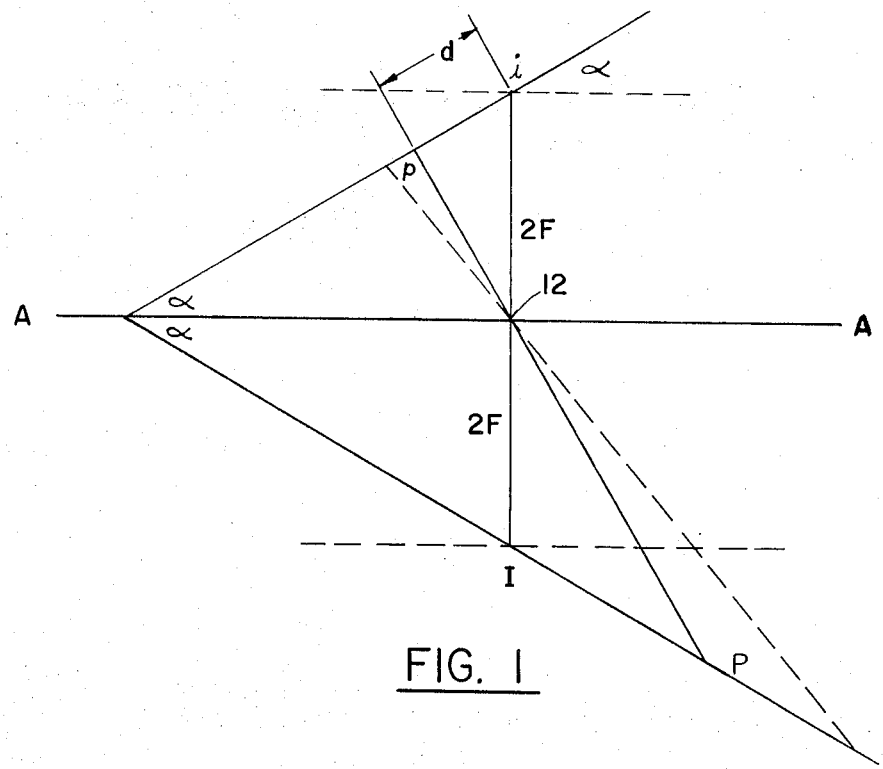
FIG. 1 is a diagrammatical representation of the geometry of a conventional one-to-one photographic rectifier.
Figure 2:
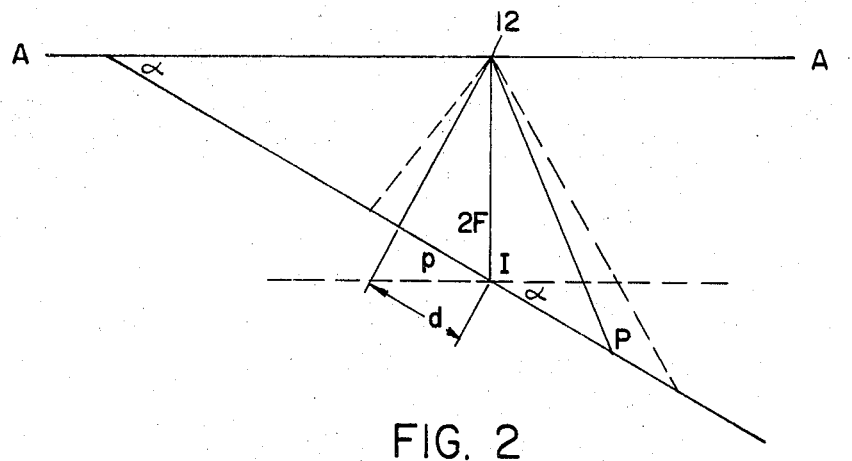
FIG. 2 is a diagrammatical representation of the geometry of the rectifier of my invention.

As is indicated by the line 44 a vertical plane passes through the perspective center (which is actually the nodal point of the lens 22) and additionally includes the hinge line 46, the isocenter 18, and the optical axis of the lens. Another vertical plane is indicated by the line 48, this plane passing transverse to the optical axis of the lens 22 and including the reflecting surface of the mirror 24. A third vertical plane is indicated by the line 50, the third plane being that of the stage 16, including the input and output platens. It may now be perceived that the angle $\alpha$ between lines 48 and 50 (as seen in a plan view) will correspond to the angles $\alpha$ of FIGS. 1 and 2.

Suitable illumination means (not shown), which are entirely conventional, are placed behind the input photo 38, if it is a transparency. Alternately, if the input photo is opaque the illumination means may be directed episcopically thereupon to generate image rays toward the reflective half-lens 22.

Rays entering the front of lens 22 will be refracted therethrough, reflected from the surface of mirror 24 and re-refracted through lens 22, coming at last to focus on the stage 16 to form the output image 52. Entirely conventional apparatus, not shown, are there provided for holding photographic papers for capturing said output image 52.

I claim:

1. Apparatus for the removal or inducement of distortions in various kinds of terrestrial photographs and other graphics, said apparatus comprising:
   a. a first surface capable of supporting said graphics;
   b. a second surface substantially coplanar with said first surface;
   c. reflective half-lens means capable of projecting an image of said graphics onto said second surface;
   d. first and second support means, said first and second surfaces being connected to one of said first and second support means, said reflective half-lens means being connected to the other of said first and second support means, said first and second support means being rotatably connected to each other whereby said first and second surfaces are rotatable relative to said reflective half-lens means about a point substantially in the plane of said first and second surfaces.

2. Apparatus for the removal or inducement of distortions in various kinds of terrestrial photographs and other graphics, said apparatus including:
   a. a first surface capable of supporting said graphics;
   b. a second surface substantially coplanar with said first surface;
   c. reflective half-lens means capable of projecting an image of said graphics onto said second surface;
   d. first and second support means, said first and second surfaces being connected to one of said first and second support means, said reflective half-lens means being connected to the other of said first and second support means, at least one of said first and second support means including means for rotatably connecting said first and second support means thereby permitting relative rotation between said first and second surfaces and said reflective half-lens means about a point substantially in the plane said first and second surfaces.

3. The apparatus as set forth in claim 2 wherein said other of said first and second support means includes guide means and reflective half-lens mounting means, said mounting means being slidably received on said guide means for movement towards and away from said point.

4. The apparatus as set forth in claim 3 wherein said mounting means includes adjustable means for positioning said reflective half-lens means such that the optical axis of said reflective half-lens means intersects said point at all relative positions of said first and second support means.

5. The apparatus as set forth in claim 4 wherein said first and second support means are relatively rotatable about an axis substantially coplanar with said first and second surfaces, said axis including said point.

* * * * *

UNITED STATES PATENT OFFICE
CERTIFICATE OF CORRECTION

Patent No. 3,778,134                    Dated December 11, 1973

Inventor(s) Brian H. Welham

It is certified that error appears in the above-identified patent and that said Letters Patent are hereby corrected as shown below:

Abstract, lines 1-5, the first two sentences should be reversed. The first sentence should be "Apparatus for the removal or inducement ... and other graphics". The second sentence should be "A photograph or other graphical display having a tilted ... an output stage" and should include the words "In such apparatus" before the beginning of the sentence which starts with "A photograph".

lines 5-6, delete "In such apparatus" and substitute --A-- before "reflective".

Column 2, line 10, after "photograph" insert --even if taken over terrain with no relief--;

lines 11-17, cancel in their entirety beginning with "the areas nearer the" at line 11 and substitute therefor --because the plane of the photograph is tilted with respect to the plane of the terrain. This results in a downward half of the tilted photograph having a larger scale than the upward half.--

Column 3, line 4, change "retro lens" to --reflective half-lens--;

line 50, delete "to the" before "carefully";
        line 51, delete "in the" and substitute --of--.

Column 4, line 9, change "including" to --includes--; and
        line 67, after "plane" insert --of--.

Signed and sealed this 14th day of May 1974.

(SEAL)
Attest:

EDWARD M. FLETCHER, JR.
Attesting Officer

C. MARSHALL DANN
Commissioner of Patents